(12) United States Patent
Lau

(10) Patent No.: US 8,597,563 B2
(45) Date of Patent: Dec. 3, 2013

(54) RECYCLED THERMOPLASTIC COMPOSITION COMPRISING WASTE THERMOSET MATERIAL AND METHODS OF MAKING

(75) Inventor: Willie Lau, Lower Gwynedd, PA (US)

(73) Assignee: Rohm and Haas Company, Philadelphia, PA (US)

( * ) Notice: Subject to any disclaimer, the term of this patent is extended or adjusted under 35 U.S.C. 154(b) by 238 days.

(21) Appl. No.: 12/459,553

(22) Filed: Jul. 2, 2009

(65) Prior Publication Data

US 2010/0007047 A1 Jan. 14, 2010

Related U.S. Application Data

(60) Provisional application No. 61/134,581, filed on Jul. 11, 2008, provisional application No. 61/217,282, filed on May 29, 2009.

(51) Int. Cl.
*C08J 5/00* (2006.01)

(52) U.S. Cl.
USPC .................................................. 264/331.11

(58) Field of Classification Search
USPC ............................................ 264/239, 331.11
See application file for complete search history.

(56) References Cited

U.S. PATENT DOCUMENTS

| | | | |
|---|---|---|---|
| 2,478,703 A | 9/1949 | Moore et al. | |
| 4,425,238 A | 1/1984 | Degen et al. | |
| 5,185,083 A | 2/1993 | Smigo et al. | |
| 5,273,661 A | 12/1993 | Pickett et al. | |
| 5,670,435 A | 9/1997 | Kajita | |
| 5,807,490 A * | 9/1998 | Davis et al. | 210/739 |
| 5,814,673 A | 9/1998 | Khait | |
| 5,938,937 A | 8/1999 | Sparapany et al. | |
| 6,060,555 A * | 5/2000 | Wright | 524/522 |
| 6,207,723 B1 | 3/2001 | Matsushita et al. | |
| 6,248,809 B1 | 6/2001 | Buckley et al. | |
| 6,417,251 B1 | 7/2002 | Brady | |
| 2003/0217467 A1 * | 11/2003 | Slutski | 29/897 |
| 2004/0076820 A1 | 4/2004 | Hodgson | |
| 2005/0035484 A1 | 2/2005 | Meyers, III et al. | |
| 2007/0049664 A1 | 3/2007 | Partanen | |
| 2010/0007047 A1* | 1/2010 | Lau | 264/239 |

FOREIGN PATENT DOCUMENTS

| | | |
|---|---|---|
| DD | 238 807 A1 | 9/1986 |
| DE | 94 07 792 UI | 3/1995 |
| GB | 612 509 A | 11/1948 |
| GB | 1 571 166 A | 7/1980 |
| JP | 05 146779 A | 6/1993 |
| JP | 11323022 A | 11/1999 |
| JP | 2004035681 A | 2/2004 |
| JP | 2008106202 A | 5/2008 |
| KR | 2001 0065946 A | 7/2001 |
| KR | 2001-0099223 | 11/2001 |
| RU | 694516 | 11/1979 |

OTHER PUBLICATIONS

Felder et al., Elementary Principles of Chemical Processes, 1978.*
Morales et al. ("Effect of waste polymer addition on the rheology of modified bitumen" Fuel 85, 936-943 (2006)).*
Scaffaro et al. ("Formulation, characterization and optimization of the processing condition of blends of recycled polyethylene and ground tyre rubber: Mechanical and rheological analysis" Polymer Degradation and Stability 90, 281-287 (2005)).*
Xi Xu et al, "Pan mill type equipment designed for polymer stress reactions". . . Plastics, Rubber & Composites Processing and Applications, Vo.. 25, No. 3, 1996,pp. 152-158.
Database WPI Week 198025, Thomson Scientific, London, GB; AN 1980-44601C, XP002552408 & SU 694516 A (Yarosl Poly) (Nov. 22, 1979) Abstract.
Database WPI Week 199537, Thomson Scientific, London, GB: AN 1995-275833, CZ 9302930A3 (Falber M) (Jul. 12, 1995) Abstract.
Rudolfs, Willem, "Principles of Sewage Treatment", National Lime Association, 1941; Bulletin 212, pp. 57-61.

* cited by examiner

*Primary Examiner* — Larry Thrower

(74) *Attorney, Agent, or Firm* — Andrew E. C. Merriam

(57) ABSTRACT

The present invention provides methods for making shapeable composite materials or shaped articles from recycled materials comprising forming a crumb slurry by, in any order, increasing the particle size of a composition comprising white water waste from one or more emulsion or dispersion polymer and combining the white water waste polymer with one or more waste thermoset material, preferably, ground tire rubber (GTR), and, then processing the combined material wet or dry as a thermoplastic to form the composite material or article. Additionally, shaped articles and composite materials can be made from substantially all recycled waste materials, such as white water waste from acrylic or vinyl polymer emulsions and waste rubber vulcanizates. The composite materials can consist essentially of reshapeable materials, i.e. without crosslinking agents, thermosettable compositions or compatibilizers to provide reshapeable or recyclable articles.

9 Claims, No Drawings

RECYCLED THERMOPLASTIC COMPOSITION COMPRISING WASTE THERMOSET MATERIAL AND METHODS OF MAKING

This application claims priority from U.S. provisional application No. 61/134,581, filed on Jul. 11, 2008, and from U.S. provisional application No. 61/217,282, filed on May 29, 2009

The present invention relates to methods for making shapeable composite materials and shaped articles of substantially all recycled waste materials from white water polymers and waste thermoset material, and materials made by such methods. More particularly, it relates to moldable or shapeable composite materials of white water comprising coagulated dispersion or emulsion polymers and waste thermoset material, such as vulcanized rubber or vulcanizate and thermoformed articles made from the composite materials.

In the commercial production of emulsion and dispersion polymers, much material is generated during the cleaning or rinsing of the reaction vessel at the end of the batch; and this material is discarded as waste. The product of the rinse, also known as "white water", contains the same polymers that are used in commercial polymers but at too low an average particle size (50-350 nm) to allow for concentration by centrifugation or other known processing methods. The product of the rinse also has a much lower concentration than commercial polymers, for example, 0.1 to 2 wt. % of total polymer solids. As there is no known cost effective way to use the polymer in the white water at the low solids level, the white water gets processed as waste material.

In waste processing, the white water polymers are usually coagulated to produce a slurry, followed by mixing the slurry with other byproducts such as biosolids or sludge, and dewatering. The resulting material is disposed in a landfill even though it may contain polymer at 30 wt. % solids. In addition to the waste itself, substantial expense is involved using current processing methods, including the cost of processing a ton of sludge at 30% solids, the cost of putting the waste in an available landfill, and the cost of making a new equivalent amount of polymer.

Even though the amount of white water generated in the production of an emulsion polymer is 1 wt. % or less of the amount of polymer produced, the total amount generated is enormous, amounting to millions of kilograms of waste polymer landfilled every year. Thus, there remains a tremendous need to effectively use the waste stream from the manufacture of emulsion or dispersion polymers.

The art of U.S. Pat. No. 5,824,673, to Khait, discloses methods of preparing polymer particles, comprising providing a supply of polymer material, effecting a chemical change to the polymer material by application of mechanical energy thereto through solid state shear pulverization in the presence of cooling sufficient to maintain the material in the solid state during the pulverization, and discharging the resulting particles. The products of Khait can be processed as thermoplastics. Khait fails to disclose waste liquids that contain polymers and fails to address how to handle such waste liquids including, for example, white water containing emulsion or dispersion polymers.

The present inventors have endeavored to solve the problem of economically using liquid waste polymers, such as white water polymers, to make useful shapeable materials and shaped products.

STATEMENT OF THE INVENTION

According to the present invention, methods for making shapeable composite materials comprise forming a crumb slurry by, in any order or simultaneously, (i) increasing the particle size of an aqueous composition comprising the white water waste from one or more thermoplastic emulsion or dispersion polymer, such as, for example, by coagulating it to a weight average particle size of the polymer of 1 μm or more, and (ii) combining a composition comprising white water waste from one or more emulsion or dispersion polymer, i.e. waste polymer, with one or more waste thermoset material, preferably, a vulcanizate, (iii) optionally, dewatering the crumb slurry to form a crumb mixture, wherein the dewatering can take place after (i) or after (ii); and, processing the crumb slurry or mixture as a thermoplastic, preferably in a devolatilizing extruder, to form the shapeable composite material or a shaped article. The waste polymer comprises one or more thermoplastic emulsion or dispersion polymer. Preferably, for ease of coagulation the white water waste comprises 30 wt. % or more, or 50 wt. % or more of one or more metastable emulsion or dispersion polymer, based on the total weight of waste polymer solids.

In one embodiment, the white water waste can further comprise one or more aqueous composition of off-grade thermoplastic waste polymer that cannot be used or sold. Suitable off-grade polymer compositions have a polymer solids content of 20 wt. % or less, preferably 12 wt. % or less, or can be diluted to such a polymer solids content. The white water waste polymer can comprise as much as 99 wt. % of off-grade waste polymer, based on the weight of total waste polymer solids.

In a preferred embodiment of the present invention, coagulation or flocculation of the aqueous composition comprising white water waste polymer increases the weight average particle size of the waste polymer in the treated composition to 20 μm or more.

The waste thermoset material should have a sieve particle size of 5000 μm or less, preferably, 2500 μm or less, or, more preferably, 600 μm or less. The lower limit of the waste thermoset material is not limited. However, in practice it ranges 50 μm or more.

The waste thermoset material preferably comprises rubber vulcanizates, such as ground tire rubber (GTR). Preferably, the compositions comprising white water waste comprise acrylic or vinyl polymers.

In an embodiment of the present invention, the methods comprise forming a crumb slurry having a solids content of 40 wt. % or less by, in either order or simultaneously, (i) coagulating an aqueous composition comprising the white water waste from one or more thermoplastic emulsion or dispersion polymer and (ii) combining white water waste from one or more emulsion or dispersion polymer with one or more waste thermoset material that has a sieve particle size of 600 μm or more; and (iii) wet milling the crumb slurry to reduce the sieve particle size of the crumb slurry solids to 600 μm or less; (iv) optionally, dewatering the wet milled slurry, e.g. by filtering; (v) optionally further, washing or drying or washing and drying the dewatered wet milled slurry; and, (v) processing the wet milled crumb slurry as a thermoplastic to form a shapeable composite material, e.g. a pellet, powder, or a shaped article.

According to the present invention, wet milling methods may be chosen from solid state shear pulverization ($S^3P$), pan milling and other known wet milling methods.

According to the present invention, thermoplastic processing methods may be chosen from known methods limited only by the fluidity of the crumb under thermoplastic processing conditions. Such methods may include, for example, extrusion, granulating extrusion, calendering, injection molding, compression molding, rotational molding, and combinations thereof. In one embodiment, for example, a granulated extrudate is compression molded.

The methods enable the formation of shapeable composite material and articles that comprise from 10 to 90 wt. % of waste thermoset material, preferably 30 wt. % or more, or 50 wt. % or more, and the remainder of waste polymer, based on the total weight of waste thermoset material and waste polymer.

According to the present invention, shapeable composite materials may comprise substantially all waste materials and may take the form of a finely divided shapeable composite or an article made by thermoplastic processing. Accordingly, shapeable composite material made by thermoplastic processing may comprise, for example, pellets, powders, granules, sheets or films, and other thermoformed shaped articles.

In an alternative embodiment, the shapeable composite materials can further comprise added virgin thermoplastic polymer. The thermoplastic virgin polymer may be added at any time before or during processing the crumb slurry or crumb mixture as a thermoplastic.

In one embodiment of the present invention, the shapeable composite materials consist essentially of compositions that do not crosslink in processing, such as, for example, thermoplastic polymer derived at least partly from white water waste and from 10 to 90 wt. % of waste thermoset material, based on the total weight of waste thermoset material and thermoplastic polymer.

Unless otherwise indicated, any term containing parentheses refers, alternatively, to the whole term as if no parentheses were present and the term without them (i.e. excluding the content of the parentheses), and combinations of each alternative. Thus, the term "(meth)acrylic" refers to any of acrylic, methacrylic, and mixtures thereof.

All ranges are inclusive and combinable. For example, a weight average particle size of 1 µm or more, or 10 µm or more, or up to 5000 µm, or up to 1000 µm, or, preferably 20 µm or more, or, preferably up to 600 µm includes ranges of from 1 to 10 µm, from 1 to 20 µm, from 1 to 600 µm, from 1 to 1000 µm, from 1 to 5000 µm, from 10 to 20 µm, from 10 to 600 µm, from 10 to 1000 µm, from 10 to 5000 µm, from 20 to 600 µm, from 20 to 1000 µm, from 20 to 5000 µm, from 600 to 1000 µm, from 600 to 5000 µm and from 1000 to 5000 µm.

As used herein, the term "acrylic" refers to materials made from a major proportion of acrylate, methacrylate, acrylic or methacrylic acid or (meth)acrolein monomers, polymers or resins.

As used herein, the phrase "aqueous" includes water and mixtures comprising 50 wt. % or more of water in a mixture of water with water-miscible solvents.

As used herein, unless otherwise indicated, the term "glass transition temperature" or "Tg" refers to the glass transition temperature of a material as determined by Differential Scanning Calorimetry (TA Instrument model Q-1000) scanning between −90° C. to 150° C. at a rate of 20° C./min. The Tg is the inflection point of the curve.

As used herein, unless otherwise indicated, the term "calculated glass transition temperature" or "calculated Tg" refers to the glass transition temperature of a material as determined by the Fox Equation as described by Fox in *Bulletin of the American Physical Society*, 1, 3, page 123 (1956).

As used herein, unless otherwise indicated, the word "polymer" includes, independently, homopolymers, copolymers, terpolymers, block copolymers, segmented copolymers, graft copolymers, and any mixture or combination thereof.

As used herein, the term "sieve particle size" refers to the particle size of a material all of which would pass through a mesh sieve of the given particle size. For example, GTR that passes through a 203 micron sized sieve (60 mesh) is referred to as having a 203 micron sized sieve particle size. For a given material, a mesh sieve particle size will be larger than the weight average particle size.

As used herein, the term "substantially all recycled waste materials" refers to any material which comprises at least 97 wt. % of waste polymer and waste thermoset material. This excludes fillers and any non-polymer materials which can be physically separated out of the material, such as metal wire. Thus, a material which contains, e.g. 5 to 10% of clay flocculating agent and the remainder of waste polymer or waste thermoset material would comprise material of "substantially all recycled waste materials".

As used herein, unless otherwise indicated, the term "weight average particle size" refers to the weight average particle size of a material as determined using a light scattering technique with a Malvern Mastersizer 2000™ Particle Size Analyzer (Malvern Instruments Ltd., Malvern, Worcestershire, UK). Materials can include coagulated or flocculated polymers and agglomerates thereof.

As used herein, the term "white water" refers to waste generated from aqueous polymer emulsion or dispersion processing, including effluent from rinsing the processing equipment as well as scrap polymer emulsions or dispersions.

The present invention provides shapeable composite materials made from recycled polymer and rubber materials as well as shaped articles made therefrom. The present inventors have found that white water from waste polymer processing can be fully reclaimed if the solids or the particle size of the thermoplastic emulsion or dispersion waste polymer is sufficiently large to permit dewatering. In addition, the present inventors have found that a wide variety of waste polymer solids isolated from white water will efficiently form compatible mixtures with a wide variety of waste thermoset materials in thermoplastic processing. Several polymer waste streams can be used at once. In addition, no compatibilizer is needed to make a useful shapeable composite material and no chemical reaction needs to take place between the waste thermoset material and the waste polymers. The lack of compatibilizer or crosslinking agents provides the added advantage that the materials in accordance with the present invention can be re-processed thermoplastic and, eventually, recycled again. In addition, the present invention enables the provision of materials containing a high proportion, e.g. 50 wt. % or more, of waste thermoset materials, especially waste vulcanizates like GTR.

The mechanical properties of the resulting materials of the present invention, including elongation, strength and modulus, compare to those same properties of composite materials made in the same way from the same virgin polymers, especially when the polymers derived from white water are waste acrylic or vinyl, e.g. styrene polymers.

Suitable compositions comprising white water for use in the present invention may include white water thermoplastic waste polymer and dilute aqueous thermoplastic off-grade waste polymer from any one or more aqueous thermoplastic polymer emulsion or dispersion, such as polymers chosen from acrylic; vinyl, e.g. styrene, styrene-acrylic and alkyl vinyl ether; vinyl ester; synthetic rubber latex, such as isoprenes, butadienes like styrene-butadienes styrene-acrylonitrile-butadienes, and nitrile rubbers; natural rubber latex; and mixtures and combinations thereof. Acrylic and vinyl polymers are preferred.

In a preferred embodiment for ease of processing to increase waste polymer particle size and/or solids, aqueous compositions comprising white water include at least some white water from metastable polymer emulsions or dispersions, i.e. those which comprise the polymerization product of 5 wt. % or less, based on the weight of polymer solids, of dispersible monomer residues, preferably, 3 wt. % or less, or which comprise 2 wt. % or less, based on the weight of polymer solids, of surfactant, preferably 1 wt. % or less is used. Preferred metastable emulsions are acrylic or vinyl polymer emulsions. As used herein, the term "dispersible monomer" refers to any polymerizable monomer which when polymerized would have an acid, acid salt, hydroxyl, amine or amine salt functional group. The amount of metastable polymer in the white water waste polymer may range 30 wt. % or more, or 50 wt. % or more, based on the total polymer solids in the waste polymer composition.

Compositions comprising white water waste polymer may be selected according to their glass transition temperature (Tg) to make shapeable composite or composite articles for specific applications. For example, polymers having a Tg of 20° C. or more generally find use in flooring, tile and molding applications, in coating films and in applications suitable for harder materials, articles and films; and polymers having a Tg of less than 20° C. find use in sealers and fillers, asphalt applications, and applications suitable for rubbery or flexible materials, articles or films.

To attain optimal mixing of waste polymers and waste thermoset materials, the particle sizes of each should be as close as possible to each other. Thus, the polymer particles from the waste polymer should be as large as possible and the waste thermoset material particles should be as small as possible.

The present inventors have found that coagulation of aqueous compositions comprising white water waste polymers provides the most efficient way to provide waste polymers of the proper particle size and solids content. Other ways to increase the particle size of waste polymers to a desirable weight average particle size and solids content include flocculation, so long as the amount and type of flocculating agent do not impair the mechanical properties and flexibility of the final product, freeze drying, and combinations thereof.

Useful coagulating agents include any known coagulation agents such as, for example, any chosen from a salt, such as sodium chloride or iron (ferric) chloride, i.e. $FeCl_3$, iron (ferrous) sulfate, i.e. $Fe_2(SO_4)_3$, alum, i.e. $Al_2(SO_4)_3$, magnesium sulfate, or preferably $FeCl_3$; an acid, such as a carboxylic acid, e.g. formic acid, or sulfuric acid to reduce the pH of the white water polymer to 4.5 or less, preferably 4.0 or less; a chemical coagulant and mixtures thereof. Acids are preferred to reduce the need for repeated washing of the polymer product. Other chemical coagulants may include alumina, aluminium chlorohydrate, calcium oxide, polyacrylamide, sodium aluminate, and sodium silicate, and the like; and natural product coagulants may include chitosan, moringa oleifera seeds, papain, strychnos seeds, and isinglass, among others.

Suitable flocculating agents include clays, e.g. kaolinite, used in conventional amounts.

Useful amounts of coagulating agents or flocculating agents may range from 0.25 to 10 wt. %, preferably 1 to 7 wt. %, based on the total weight of white water polymer solids.

For combining with waste thermoset material, suitable waste polymer particles may preferably have weight average particle sizes as close as is practicable to the sieve particle size of the waste thermoset material. However, suitable polymer weight average particle sizes range 1 μm or more, or 10 μm or more, or up to 5000 μm, or up to 1000 μm, or, preferably 20 μm or more, or, preferably up to 600 μm. Below a polymer weight average particle size of 1 μm, the undesirable loss of waste polymer during dewatering or washing may occur.

The aqueous compositions comprising white water polymers are suitably coagulated or flocculated to increase their solids content to a total polymer solids before dewatering of 2.0 wt. % or more, preferably, 4 wt. % or more, or 5 wt. % or more, and up to 40 wt. %.

In a preferred embodiment, the ratio of the weight average particle size of the coagulated or flocculated waste polymer to the weight average particle size of the waste thermoset material ranges from 1:20 to 5:1, or, preferably, 1:10 or more.

In another embodiment, the waste polymer compositions, i.e. those having increased solids content, could be used directly in the preparation of the composite resin without dewatering. Dewatering and redispersing allow for convenient storage and transport of the polymer.

Suitable waste thermoset material may comprise any particulate crosslinked polymer waste, such as that obtained from rubber vulcanizates, e.g. GTR or ground shoe rubber, cured urethanes, e.g. polyurethane foam, ground hard plastics, such as from urethanes, polycarbonates, epoxy resins, aminoplast resins, phenolic resins, e.g. phenol-formaldehydes and cross-linked polyolefins (PEX). The waste thermoset material may further comprise fillers, such as carbon black, silica, silicates, and alumina.

The sieve particle size of waste thermoset material suitable for use in composites may range from 50 to 5000 μm, for example 177 μm or more, or 180 μm or more. The waste thermoset material may be, for example, in shredded form, in the form rubber pellets, rubber strands, or in the form of chips, or powder.

The waste polymer and waste thermoset material are combined by milling or mixing to form a crumb slurry or, if the waste polymer is dewatered prior to combining them, a crumb mixture.

Combining to make the crumb slurry may optionally comprise wet milling. Wet milling is followed by dewatering and, if needed, processing to dry the crumb.

In an embodiment of the present invention where the waste thermoset material has a sieve particle size of 600 μm or more, the combined waste thermoset material and waste polymer is wet milled to reduce weight average particle size of the waste thermoset material in the mixture.

Suitable wet milling techniques include pulverizing the mixture of waste thermoset material and waste polymer as a slurry, and thereby reducing the particle size of the waste thermoset material particles while in intimate contact with waste polymer. For example, solid state shear pulverization ($S^3P$) by wet milling can be applied to the slurry mixture of waste polymer and waste thermoset material. Wet milling can be carried out in a pan mill or a twin screw extruder or can comprise solid state shear pulverization ($S^3P$). Other suitable techniques include, but are not limited to, milling, for example, in a rotating grinding mill, disc milling, stone milling, plast milling; as well as other pulverizing techniques, such as the Berstorff pulverizer, extrusion pulverization, solid state shear extrusion, and Brubender Extrusion. Solid state shear extrusion, SSSE, either with heating in the molten state or under ambient conditions, may be used with aqueous slurry mixtures. Preferably, wet milling comprises $S^3P$, which is defined as the non-melting pulverization of waste thermoset material in the presence of waste polymer in the solid state to impart intense shear stress to the solid particles, and carried out with the material at ambient temperatures or with cooling.

Wet milling or $S^3P$ may not result in any chemical reaction of waste thermoset material and waste polymer. However, the crumb formed in the wet milling methods of the present invention may exhibit improved elongation break and cold flex properties when compared to that of either the waste thermoset material or the polymers taken from the white water alone.

The methods of the present invention may further comprise dewatering the crumb slurry and, optionally, washing the resulting crumb to remove impurities prior to thermoplastic processing. Dewatering the crumb slurry, may include, for example, (micro)filtration or centrifugation of the solids to remove excess water.

The methods may also comprise drying the crumb mixture resulting from dewatering. Optionally, in some embodiments, dewatered crumb material may be dried by wringing, pressing, or freeze-drying. Conventional methods of drying can also be employed including, for example, the use of ovens or dryers such as vacuum dryers, air dryers, drum dryers, or hand dryers.

The methods of the present invention further comprise thermoplastic processing the crumb mixture or the crumb slurry, and further reduction of water content may occur during such processing. Thermoplastic processing may comprise kneading the crumb material, with optional heating and, optionally, devolatilization. Kneading may be accomplished using a two-roll mill, or by extrusion of the material, such as in a devolatilizing extruder or, in some cases, at delivery to an injection molder. Thermoplastic processing can shape the composite material directly into an article, such as via extrusion, or it may result in the formation of shapeable composite materials such as pellets, granules or powder. Likewise, two-roll milling may be used in conjunction with compression molding to transform the material into a molded article. Thermoplastic processing may also comprise calendering with or without heating, compression molding, rotational molding or injection molding. Preferably, thermoplastic processing comprises kneading in a counter rotating twin screw extruder.

In an embodiment of the present invention, the extrusion or a similar melt-processing procedure may be used to form a shapeable composite material, such as granules, powders or pellets that can later be formed into shaped articles or used as fillers or in sealers.

The shapeable composite material of the present invention can be made by thermoplastic processing into finely divided materials or into articles of any shape, such as sheets and films, or used as a molding or forming material. Films produced according to the present invention may be used in forming multilayer articles and laminates for many applications.

In one embodiment, the shapeable composite material of the present invention comprises substantially all recycled material. Alternatively, one or more virgin thermoplastic polymer may be added before or during thermoplastic processing in amounts of up to 50 wt. % of the total composite composition.

The shapeable composite materials may additionally comprise various additives as desired or required according to the end use of the composite crumb, such as, for example, one or more of vulcanizing agent, thermoset resin or polymer, antioxidant, UV-stabilizer, fire-retardant, colorant, filler in the form of, for example, powder, fiber, sliver or chip; reinforcing material, such as non-woven, or scrim, pigment, thermoset resin or polymer, thermosettable (curable) resin or polymer, and processing aid, such as a mold release agent and small amount of surfactant. Additives can be added before or during thermoplastic processing.

Useful end products for the shapeable composite materials include, but are not limited to, automotive parts, such as tires, bumpers, gaskets, fan belts, wiper blades, liners, vibration-dampening mounts, underbody coating, insulation and trim; building products such as roofing membranes, roofing shingles or roofing felt, geomembranes, insulation panels, sound dampening materials, flashing, modified EPDM roofing membranes, and asphalt reinforcement; asphalt sealers, crack fillers for asphalt and cement, and asphalt concrete road surfacing material; concrete modification; modified neoprene articles; tiles or tile backings; carpet backings; sound proofing materials; acoustic underlayment; flooring underlayment and matting; industrial products such as liners for landfill; sports utilities such as artificial turf and track; playground surfaces; mats and pads; ball cores; and consumer products such as floor tiles or flooring sheets; shoe soles; liners; covers; and molded products, such as gardening pots, molded household accessories, and molded decorative items; and other uses, such as friction padding, wood floor backing, cable insulation, garden hoses, tool handle wrap and furniture leg pads.

In one embodiment, hot melt adhesives may comprise thermoplastic waste polymer solids in amounts ranging from 40 wt. % or more of the shapeable composite materials of the present invention.

In another embodiment, the shapeable composite materials may be formed into films for laminates. Laminates may comprise the composite materials as one or two or more layers, such as an underlayment layer in reinforced EPDM roofing membranes, rubbery supports or padding layers in flexible sheeting and tapes with an adhesive layer. Any laminate product stored as a roll may have an optional adhesive layer and a release layer to protect the adhesive layer.

EXAMPLES

In the following examples, the sheets produced were evaluated for Tensile strength, Elongation at Break (% E) and tear resistance, according to the following testing methods:

Processing Example 1

Treatment of White Water from the 1% Solids to the Wet Cake

White water emulsion polymers from a mixture of butyl acrylate/methyl methacrylate/methacrylic acid (BA/MMA/MAA) polymers ranging from 90 BA/9 MMA/1 MAA (by weight of reactants) to 40 BA/39 MMA/1 MAA were sampled from 3 processing facilities at Bristol, Pa. (Example 1), Knoxville, Tenn. (Example 2), and Charlotte, N.C. (Example 3).

The total amount of polymer solids in the white water was estimated by measuring the solid content of the white water and calculated based on the total volume of the retention pit. $FeCl_3$ solution (40%) was added to the white water dispersion under mild agitation. The total $FeCl_3$ is 6 wt. % with respect to polymer on a solids basis. The coagulated latex polymer (~5% solids) sank to the bottom of the pit and was pumped to a centrifugal dewatering device to concentrate the polymer in the form of a wet cake. The solids of the wet cake was measured by gravimetric methods, and is shown in Table 1, below.

TABLE 1

Coagulated White Water Polymer Solids

| Example | % solids |
|---------|----------|
| 1 | 41.2 |
| 2 | 42.6 |
| 3 | 62.4 |

Example 2

Forming Ground Tire Rubber (GTR) Crumb Mixture

To prepare 250 g of a 35 polymer/65 rubber (w/w) composite, 213 g of the wet cake of Sample A (41% solids) was dispersed in 875 g of water and 162.5 g of GTR 150 µm crumb was added with stirring. The polymer/rubber composite slurry (20% solid of polymer and rubber) was thoroughly mixed for 15 minutes and the solids were filtered through a 10 micron filtering sock. The excess water was squeezed out and the damp composite solid was dried in a vacuum oven at 60° C. for 12 hours.

Example 3

Thermoplastic Processing of Crumb Mixtures into Sheets 250 g of the dried mixture solid (<5 wt. % moisture content) was processed in a two-roll mill at 195° C. for 2 minutes and compression molded by a Reliable Hydraulic Press (Reliable Rubber & Plastics Machinery Company, North Bergen, N.J.) at 195° C. between steel plates fitted with a 0.102, (40 mil thick), 25.4 cm×25.4 cm (10 inch×10 inch) frame for a total of 5 minutes at the following pressures: 1 minute at 3.45E7 Pascal (5000 psi); 1 minute at 6.89E7 Pascal (10000 psi) and 3 minutes at 1.65E8 Pascal (24000 psi), followed by cooling under a pressure of 1.65E8 Pascal (24000 psi) at room temperature for 5 minutes in a cool press fitted with circulating water.

Example 4

Test Methods for Mechanical Properties and Tear Resistance

Composite samples from Example 3 were cut from the molded sheets in rectangular strips 7.62 cm L×1.27 cm W×0.102 cm thick (3"×½"×40 mils). Tensile strength and elongation was carried out following the ASTM D-2370 (ASTM Volume 06.01, February 2008) protocol on a Tinius Olsen H10KS tensile tester (Tinius Olsen Inc., Horsham, Pa.). The crosshead rate was 2.54 cm (1.0 inches)/minute, and a gauge length of 2.54 cm (1.0 inch). The test was run under controlled temperature of 23° C. and controlled relative humidity of 50%. From this test, the elongation at break, maximum stress (tensile strength) and break energy for the each sample was determined.

Tear resistance was measured according to ASTM D624 (ASTM Volume 09.01, July 2008) on a Tinius Olsen H10KS tester. A tearing strain (and stress) was applied to a test specimen (cut by a Type C die as described in ASTM D624) (ASTM Volume 09.01, July 2008) under a constant rate of crosshead traverse 50.8 cm (20")/minute until the specimen is completely torn.

In the comparative Examples 1A and 2A, the polymer is virgin polymer coagulated and mixed with waste thermoset material by charging 875 g of water to a mixing vessel equipped with a mechanical stirrer, adding 9.4 g of $FeCl_3$ as a 40 wt % aqueous solution to the water, adding 125 g of ground tire rubber (Edge Rubber, Chambersburg, Pa.) having a sieve particle size of 180 µm (80 mesh) with stirring until all the rubber particles were dispersed in the water phase to form a slurry, followed by adding 250 g the polymer latex (50% solids w/w/) to the slurry and stirring for 15 minutes. The coagulated polymer/rubber slurry was allowed to equilibrate for 12 hours and was filtered using a 10 µm filtering sock to obtain a polymer/rubber crumb mixture. The solid was washed three times with water through the filtering sock. Excess water was squeezed out and the damp solid was dried in a vacuum oven at 60° C. for 12 hours to yield a dried crumb mixture.

The results of the tests are presented in Table 2, below.

TABLE 2

Mechanical and Flexibility Properties

| Example | Tg (° C.) (peak) | Max Tensile (psi) | Max Elongation (%) | Tear Resistance |
|---------|------------------|-------------------|--------------------|-----------------|
| 1 | 14.9/46.2 (Broad) | 619 | 217 | 149 |
| 2 | −46.7/36.9 (Broad) | 658 | 110 | 139 |
| 3 | 34.4 (Broad) | 692 | 377 | 191 |
| 1A[1] Comparative | 20 (Sharp) | 681 | 377 | 172 |
| 2A[2] Comparative | −6 (Sharp) | 164 | 448 | 53 |

[1]Comparative Example 1A 47 BA/52 MMA/1 MAA, Tg of 20° C.
[2]Comparative Example 2A 70 BA/29 MMA/1 MAA, Tg of −6° C.

The mechanical properties of inventive Examples 1, 2 and 3 were comparable to that made from virgin polymer latices in Comparative Examples 1A and 2A. The polymer in Comparative Example 1A has a glass transition temperature (Tg) >0° C. In the white water polymer mixtures, the tensile properties remained surprisingly good even where they contained soft polymers. In the softer virgin polymer such as was used in Comparative Example 2A, the tensile strength decreased with an increase in % Elongation.

We claim:

1. A method for making shapeable composites comprising:
    forming a crumb slurry by, in any order or simultaneously,
        (i) increasing the particle size of an aqueous composition comprising white water waste polymer solids from one or more thermoplastic emulsion or dispersion polymer and (ii) combining a composition comprising white water waste from one or more thermoplastic emulsion or dispersion polymer with one or more waste thermoset material;
    optionally, dewatering the crumb slurry to form a crumb mixture, wherein the dewatering can take place after (i) or after (ii); and,
    processing the crumb slurry or mixture as a thermoplastic to form a shapeable composite material.

2. The method as claimed in claim 1, wherein the white water waste comprises 30 wt. % or more of one or more metastable emulsion or dispersion polymer, based on the total weight of waste polymer solids.

3. The method as claimed in claim 1, wherein the white water waste comprises as much as 99 wt. % of off-grade waste polymer, based on the total weight of waste polymer solids.

4. The method as claimed in claim 1, wherein the white water waste comprises one or more acrylic or vinyl polymer.

5. The method as claimed in claim 1, wherein the increasing the particle size comprises coagulation or flocculation.

6. The method as claimed in claim 5, wherein the increasing the particle size results in a polymer composition having a weight average particle size of 1 μm or more.

7. The method as claimed in claim 6 wherein the waste thermoset material has a sieve particle size of 600 μm or more, the method further comprising:
- wet milling the crumb slurry prior to any dewatering to reduce the sieve particle size of the crumb slurry solids to 600 μm or less,
- optionally, dewatering the wet milled slurry to form a crumb mixture; and
- optionally, washing and/or drying dewatered wet milled slurry,
- wherein, the crumb slurry has a solids content of 40 wt. % or less prior to wet milling.

8. The method as claimed in claim 7, wherein wet milling methods are chosen from solid state shear pulverization ($S^3P$) and pan milling.

9. The method as claimed in claim 1, wherein processing the crumb slurry or mixture as a thermoplastic comprises any one of extrusion, granulating extrusion, calendering, injection molding, compression molding, rotational molding, and combinations thereof.

* * * * *